(12) United States Patent
Larson

(10) Patent No.: US 8,985,344 B2
(45) Date of Patent: Mar. 24, 2015

(54) STORAGE SYSTEM

(76) Inventor: Roger Charles Larson, White Bear Lake, MN (US)

( * ) Notice: Subject to any disclaimer, the term of this patent is extended or adjusted under 35 U.S.C. 154(b) by 220 days.

(21) Appl. No.: 13/494,496

(22) Filed: Jun. 12, 2012

(65) Prior Publication Data

US 2012/0312760 A1 Dec. 13, 2012

Related U.S. Application Data

(60) Provisional application No. 61/520,649, filed on Jun. 13, 2011, provisional application No. 61/573,825, filed on Sep. 13, 2011.

(51) Int. Cl.
*B62H 3/12* (2006.01)
*B62H 3/00* (2006.01)
*A47B 46/00* (2006.01)

(52) U.S. Cl.
CPC .. *B62H 3/12* (2013.01); *B62H 3/00* (2013.01); *A47B 46/005* (2013.01)
USPC ...................................... 211/1.51

(58) Field of Classification Search
CPC .............. B62H 3/00; B62H 3/02; B62H 3/12; A47B 46/00; A47B 46/005; A47B 51/00; A47F 5/0087
USPC ............ 211/1.51–1.56, 17–24; 248/317, 320, 248/322, 339, 340
See application file for complete search history.

(56) References Cited

U.S. PATENT DOCUMENTS

| | | | | |
|---|---|---|---|---|
| 2,851,165 | A * | 9/1958 | Schreyer et al. | 211/1.51 |
| 4,915,461 | A * | 4/1990 | Kingsborough et al. | 312/247 |
| 5,228,763 | A * | 7/1993 | Gingold | 312/266 |
| 5,249,858 | A * | 10/1993 | Nusser | 312/319.6 |
| 5,474,189 | A * | 12/1995 | Peterson | 211/18 |
| 5,979,671 | A * | 11/1999 | Pan et al. | 211/1.57 |
| 6,237,781 | B1 * | 5/2001 | Dahl | 211/17 |
| 7,150,449 | B1 * | 12/2006 | Dueck et al. | 254/278 |
| 7,922,009 | B1 * | 4/2011 | Larson | 211/17 |
| 8,061,789 | B2 * | 11/2011 | Krueger | 312/248 |
| 8,468,745 | B2 * | 6/2013 | Krause | 49/199 |
| 2007/0029267 | A1 * | 2/2007 | Hall et al. | 211/17 |
| 2010/0140194 | A1 * | 6/2010 | Krueger | 211/1.57 |

* cited by examiner

*Primary Examiner* — Patrick Hawn
(74) *Attorney, Agent, or Firm* — Eggink & Eggink; Anthony G. Eggink; Katrina M. Eggink

(57) ABSTRACT

An elevated tiltable storage assembly for the storage and retrieval of goods. The tiltable storage assembly includes a stationary frame structure for mounting to a wall and a tiltable frame structure pivotally connected to the bottom of the stationary frame. The tiltable frame has a storage structure for holding goods. A windable strap extends between the top of the stationary frame and the top of the tiltable frame. An activatable power assembly operates to wind and unwind the strap to rotate the tiltable frame from a storage to a retrieval position to provide access to the goods.

15 Claims, 6 Drawing Sheets

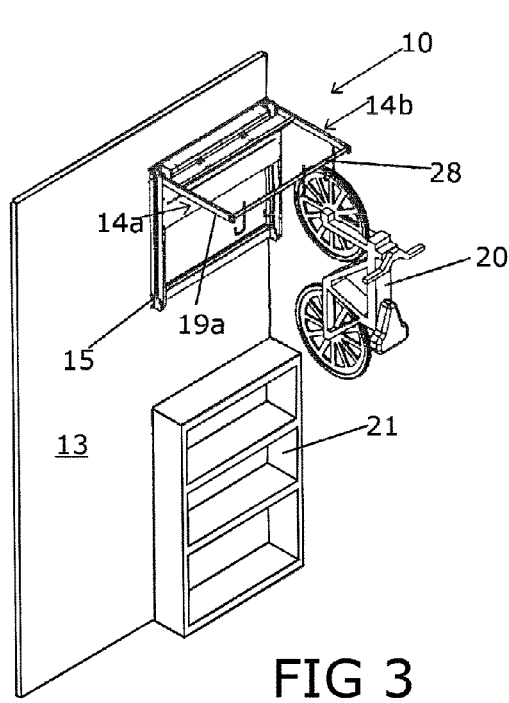
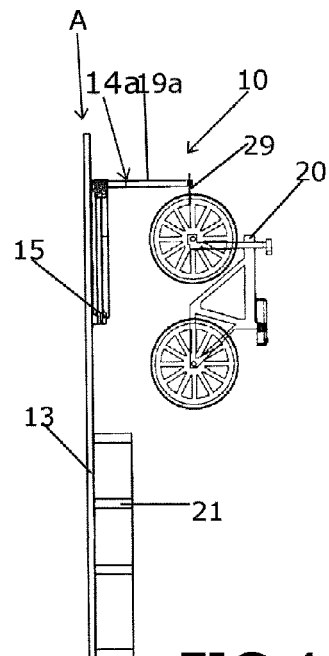
FIG 3
FIG 4
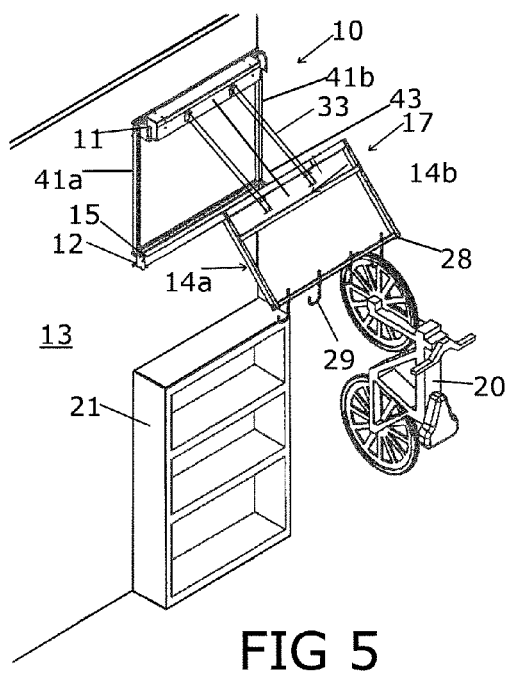
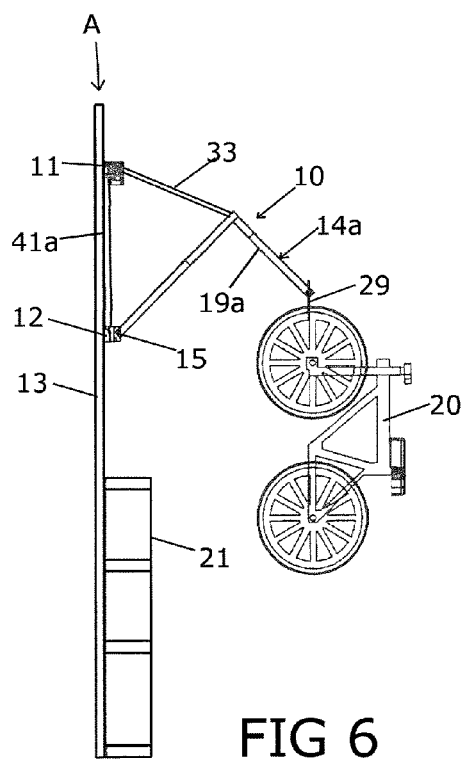
FIG 5
FIG 6

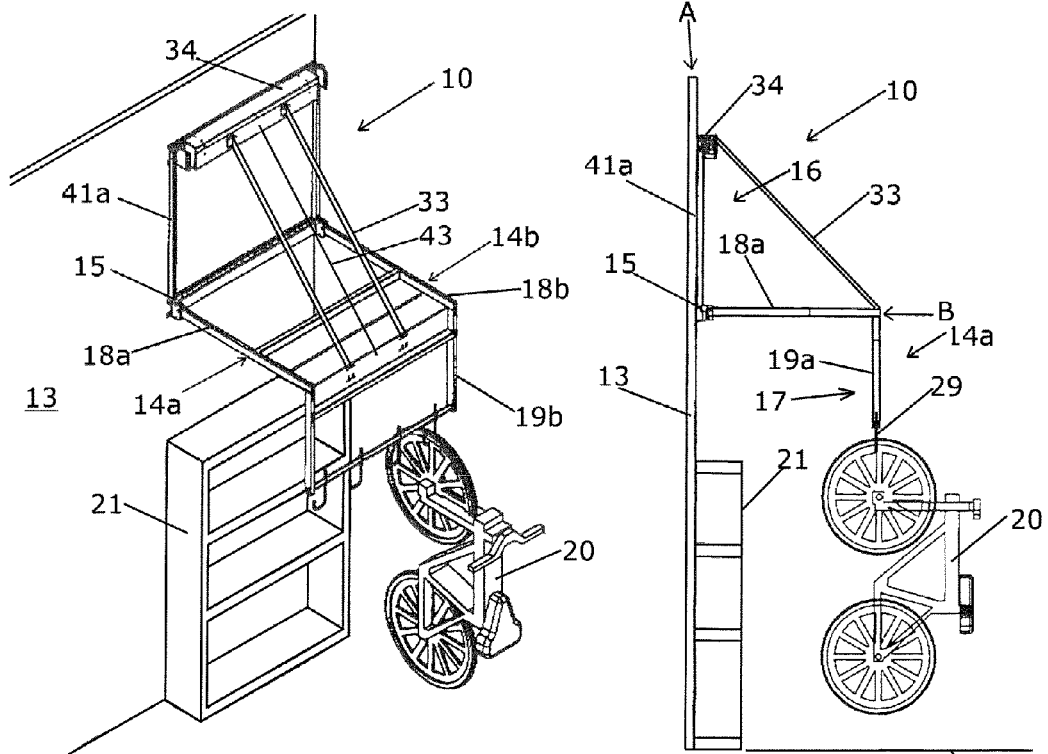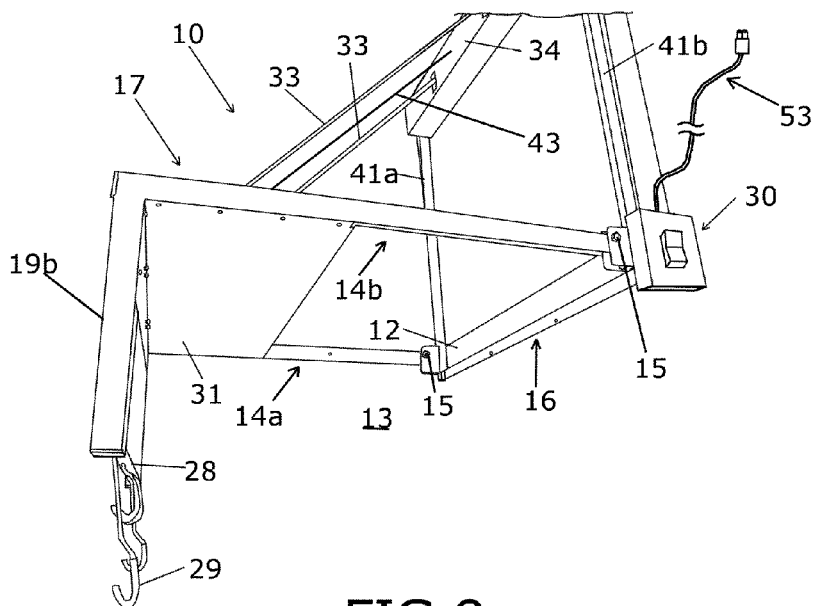

STORAGE SYSTEM

This Application claims the benefit of U.S. Provisional Patent Application Ser. No. 61/520,649 having a Filing Date of Jun. 13, 2011, and U.S. Provisional Patent Application Ser. No. 61/573,825 having a Filing Date of Sep. 13, 2011 which are incorporated by reference herein.

FIELD OF THE INVENTION

Background of the Invention

The present invention relates generally to storage systems and particularly to wall mounted storage systems adapted to store and retrieve goods from elevated wall locations that are typically unused. Particularly, the present invention relates to a pivotable storage system having activatable power means to store and retrieve goods such as bicycles, garments and other goods, for example, from an elevated position to an accessible floor location.

Storage systems have typically comprised storage shelving of varying heights and often requiring the use of ladder systems to provide access to the stored goods. These prior art storage shelves are often limited in use and difficult to access, for example, limited to the storage of boxes and to containers and products of specified dimensions. The storage of larger products, such as bicycles, have typically required the use of specialized storage racks which are relatively complex in structure and expensive to manufacture and install.

Storage systems in store warehouses typically utilize storage shelving systems of specified heights, i.e. 6-8 feet, and leave unused overhead wall space above them which are not reachable even by using prior art ladder systems.

The pivotable storage system of the present invention provides a use for previously unused warehouse and/or store wall spaces and overcomes the difficulties and shortcomings of prior art storage and retrieval systems such as shelving and associated ladder systems. The storage system of the invention provides a pivotable storage system that can be mounted above existing storage shelves and which when activated automatically lowers goods such as bicycles, garments, kayaks, storage racks and the like into the aisle area at ground level and adjacent the storage shelves, for example.

The storage system of the present invention is easily mountable in typically unused warehouse or store spaces, is economical, efficient, safe and easily utilized to store and retrieve heretofore difficult to store and retrieve goods such as bicycles, hanging garments and other goods.

SUMMARY OF THE INVENTION

The storage and retrieval system of the invention provides a versatile, easy to use storage assembly that may be mounted to a wall above existing shelving units in a warehouse or on the retail floor, for example.

The storage system of the invention is a tiltable storage assembly for mounting at an elevated position and comprises a stationary frame structure for mounting to a base structure, such as a wall. A tiltable frame structure is mounted for pivoting to the stationary frame structure and which has a storage structure for holding goods. An extendable connection means such as a strap on a spool is provided to interconnect the stationary frame structure and the tiltable frame structure. An activatable power assembly mounted to the stationary frame structure is operative on the extendable connection means to permit the storage structure of the tiltable power assembly to pivot from a storage position to thereby provide access to the goods and to pivot from a retrieval position to a storage position for the storage of goods at an elevated position.

The stationary frame structure is comprised of an upper bracket, a lower bracket and connecting side members. The tiltable frame structure is comprised of a pair of pivotable arm assemblies connected for rotation to the lower bracket of the stationary frame structure. The storage structure may be a rotatable bar connected between the terminal ends of the pivotable arm assemblies.

The storage assembly structure provides a tiltable frame structure which may utilize a rotatable storage bar or a rotatable storage bar from which a plurality of hooks may extend for holding various goods such as bicycles, for example. The rotatable storage bar or other storage structures may extend beyond or outside of the arm members which form the tiltable frame structure to thereby provide an effectively enlarged storage and retrieval system.

The storage system utilizes a power assembly comprising an AC/DC converter to provide low voltage DC power and a drive shaft with a DC motor/gear box. Strap spools are mounted on the drive shaft and which control the movement of the tiltable frame structure with respect to the stationary frame structure. An activation switch, wiring with modular connectors, upper and lower limit switches as well as safety devices are provided with respect to the movement of the drive shaft and the movement of the tiltable frame structure with respect to the stationary frame structure.

The storage system of the invention may be mounted above typical shelving structures, i.e., 6'H×4'W×2'D, may be provided in 4 ft. increments, for example, or may be ganged adjacently to provide storage systems of 8 ft., 12 ft. or other lengths to accommodate storage and retrieval requirements. Further, elongated storage bars, i.e. 6 ft, may be provided to increase storage space.

An advantage of the present invention is to provide a versatile storage system having varying storage structures which permit products of varying dimensions to be stored at elevated positions in a warehouse and/or a retail establishment.

Another advantage of the invention is to provide a storage system that may be mounted at varying elevations and which is adjustable to tilt products at variable heights and to specified retrieval locations.

Another advantage of the invention is to provide a versatile storage system which permits the use of a storage bar having variable lengths and product attachment means.

Another advantage of the invention is to provide a storage system which utilizes power means, including a low voltage DC system and constant contact switch, that is easy and safe to operate by a user.

Another advantage of the invention is to provide a storage system having various safety features which may control the movement of the drive shaft and the tiltable frame structure.

These and other benefits of this invention will become clear from the following description by reference to the drawings.

BRIEF DESCRIPTION OF THE DRAWINGS

FIG. 3 is a perspective view showing the storage system of the invention mounted on a wall above a shelving unit and being in a storage position;

FIG. 4 is a lateral plan view showing the storage system of FIG. 3;

FIG. 5 is a perspective view showing the storage system of FIG. 3 being lowered;

FIG. 6 is a lateral plan view showing the storage system of FIG. 5;

FIG. 7 is a perspective view showing the storage system of FIG. 5 being in a lowered retrieval position;

FIG. 8 is a lateral plan view showing the storage system of FIG. 7;

FIG. 9 is a perspective view showing a lateral view of the storage system;

DESCRIPTION OF THE PREFERRED EMBODIMENTS

Figure 1:
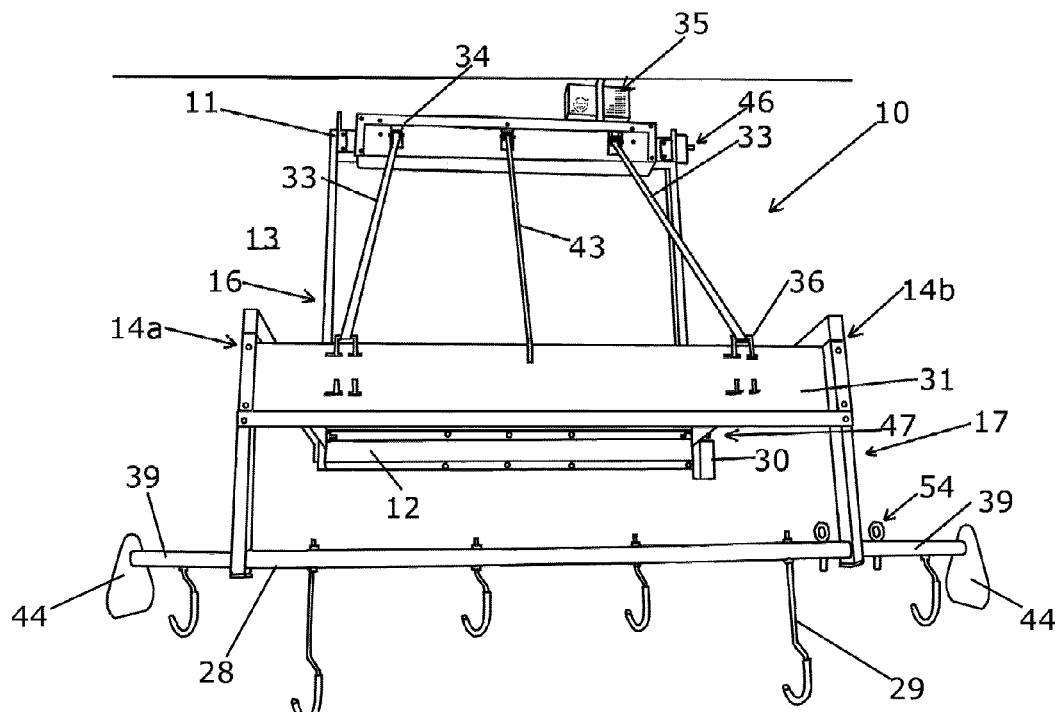
FIG. 1 is a perspective frontal view of the storage system of the invention and showing the storage system mounted on a wall and in a retrieval position.

A tiltable storage assembly 10 for the storage and retrieval of a variety of goods from an overhead location. The storage assembly 10 has a stationary frame structure 16 having means for mounting to a wall at an elevated position. The stationary frame structure 16 has an upper mounting rail or bracket 11 and a lower mounting rail or bracket 12. A tiltable frame structure 17 is connected for pivoting to the lower mounting bracket 12 of the wall mounted stationary frame structure 11. The tiltable frame 12 has a storage structure, such as a rotatable storage bar 28, for storing goods. A power structure having a drive shaft and windable straps connect the stationary frame structure 16 for moving the goods from an elevated position to a retrieval position at ground level.

Figure 2:
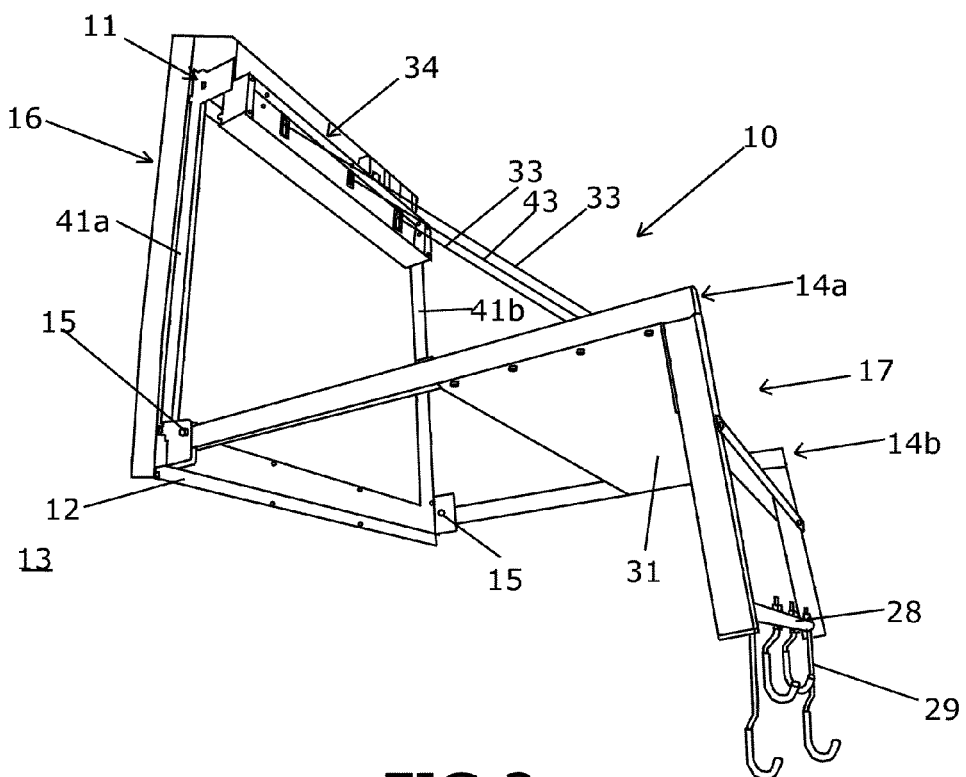
FIG. 2 is a perspective lateral view of the storage system of FIG. 1.

Referring to FIGS. 1 and 2, the storage and retrieval system 10 of the present invention is shown mounted in an elevated position on wall 13. The storage system 10 is shown to have a stationary frame structure 16 mounted to the wall 13 and a tilting or pivoting frame structure 17 which is shown to pivot at the bottom of the stationary frame structure 16 at pivot 15. A pair of straps 33 are utilized to hold the tilting frame structure 17 with respect to the mounted stationary frame structure 16 from an elevated storage position to a retrieval position at ground level. As shown, a rotatable storage bar 28 having hooks 29 is exemplary of the purpose of the present invention, which is to store and retrieve a variety of products, such as bicycles, garments and other products, as shown in FIGS. 3-8 and FIGS. 14-16.

The rotatable storage bar 28 is shown having storage bar portions 39 extending outwardly from the tiltable frame structure 17. The outwardly extending portions 39 permit a storage system 10 having a length of four feet, for example, to provide a storage capability of six or more feet, for example, to thereby reduce the number of storage systems 10 required to provide full use of a wall length above a storage shelf system of a predetermined height and length. The end of the arm assemblies 14a, 14b may each be provided with opposing apertures of different diameters, i.e., 1.0 and 1.25 inches, to thereby accommodate a storage bar as shown in FIG. 1 (1.0 inch D) or as shown in FIG. 2 (1.25 inch D). Fasteners, i.e., cotter keys 54, are provided to maintain the elongated rotatable storage bar 28 with respect to the arm assemblies. End plates 44 are shown provided on the storage bar ends to provide a visual safety structure. The end plates 44 may have warning tags, i.e., yellow/black tags, for safety purposes.

FIGS. 1 and 2 show hooks 29 extending downwardly from rotatable storage bar 28 and having different lengths or configurations. The hooks 29 may also be spaced differently on storage bar 28 to thereby accommodate different sized bicycles as well as different styles of bicycles, i.e., high performance bikes, mountain bikes and standard touring bikes. The more expensive high performance bikes, for example, may be provided greater spacing so as to ensure bicycle integrity. For example, two, three, four or other hook bar structures may be provided for such use.

Referring again to FIGS. 1 and 2, the storage system 10 is shown to have an upper mounting bracket 11, a lower mounting bracket 12, and vertical supports 41a and 41b which are shown mounted against wall 13, the latter forming the frame stationary structure 16 and which may be a welded steel one piece assembly. The pivoting or tilting frame structure 17 is shown to comprise pivotable arm assemblies 14a and 14b which are connected at pivots 15 to end brackets 24b, 25b affixed at the lower mounting bracket 12. A support plate 31 is shown mounted between the pivotable arm assemblies 14a and 14b.

Straps 33 are shown connecting the top of the stationary frame structure 16 to the top of the tilting frame structure 17 at strap securement hooks 36. Straps 33 may be 2 inch wide nylon strapping, for example, similar to automotive seat belt strapping and rated to hold 1,750 lbs. for example. Straps 33 are wound onto and unwound from spools 38 within housing 34 as further discussed below with respect to FIG. 13. Although straps may be preferred, other strong, flexible and windable materials may be used within the purview of the invention. An activation button or toggle switch 30 is provided to operate the storage system 10. For safety purposes, a user pushes and maintains pressure on button 30 to activate the motor/gearbox 26 of the assembly 10 so as to lower and raise the pivotable arm assemblies 14a and 14b of the tiltable frame structure 17 and, thus, the storage bar 28. Upper and lower limit switches 46, 47 are provided to thereby limit the travel of the storage bar 28 between approximately 0° and 90° with respect to the vertical wall 13. The limit switches 46 and 47 are contacted and activated by the rotating tiltable frame structure 17 and the lower limit switch 47 may be adjustable with respect to the contact point of the frame structure 17. A beeping sound source and/or visual alarm signal may be provided so as to provide a warning signal when the storage system 10 is in use.

Upper mounting bracket 11 is shown covered by housing structure 34, the latter housing the power means of the storage assembly 10, further discussed below, and which is shown powered by converter 35, i.e., AC/DC 24 V, although other power means may be utilized. The low voltage DC electrical system, is utilized to drive the motor/gearbox 26 mounted to the driveshaft 23 of the storage assembly 10, as further discussed below.

FIGS. 3-8 show the movement of the storage system 10 when mounted on wall 13 above shelving 21 and having a bicycle 20 hanging from hook 29 attached to rotatable storage bar 28. FIGS. 3 and 4 show the storage system 10 in a storage configuration, or where the arm member 19a of the pivotable arm assembly 14a is directed approximately 90° with respect to wall 13 or at a first position A. In FIGS. 5 and 6, the pivotable arm assemblies 14a and 14b are shown pivoted with respect to pivot 15 and held by straps 33 at an angle of approximately 45°. The rotatable storage bar 28 maintains the bicycle 20 in a vertical position. In FIGS. 7 and 8, the arm member 19a of the pivotable arm assembly 14a is shown to be at approximately 0° or perpendicular to floor 22 at a second position B. At this position, the bicycle 20 may be removed from hook 29, for example, and another bicycle placed thereon for subsequent storage above shelving 21.

Figure 10:
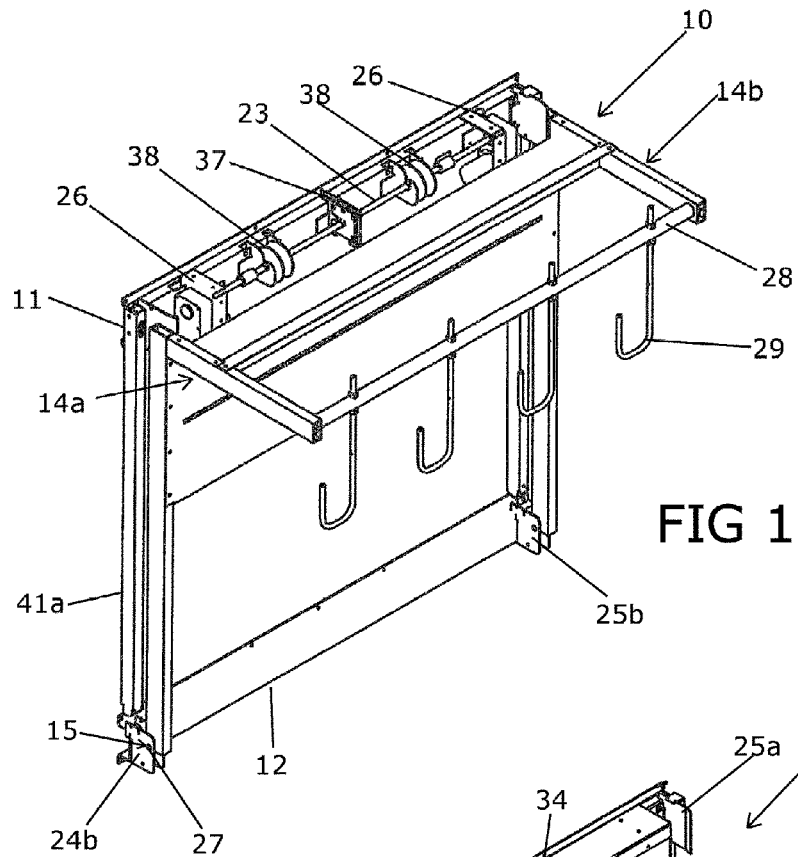
FIG. 10 is a perspective view showing the stationary frame structure and pivotable frame structure of the storage assembly of the invention.
Figure 11:
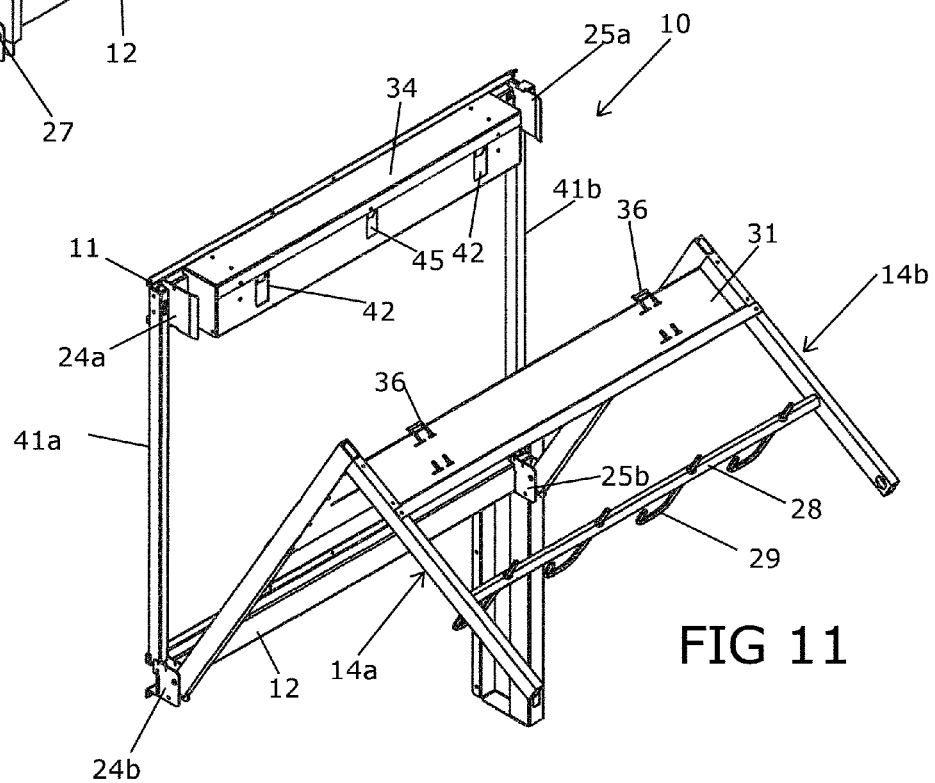
FIG. 11 is a perspective view showing the pivotable frame structure of the storage assembly in a tilted position.

Referring to FIGS. 9-11 show the lower end bracket 25a and the upper end bracket 24a, respectively, mounted to lower mounting bracket 12. The lower end bracket 25a has aligned apertures 27 which receive pivot pins 15, as shown in FIG. 2. A pair of upper and lower end brackets, 24a, 24b and 25a, 25b are utilized in each assembly 10. FIG. 11 further shows the connection of the lower end bracket 25a to the lower mounting bracket 12 and the pivotable connection of the lower portion of the pivotable arm 14a to the lower end bracket 25a via pivot pin 15.

The storage assembly 10 may be mounted at a specified elevated position depending upon the size of the goods as well as the dimension of the shelving unit(s). Further, the length of the arm members 19a and 19b may be varied to accommodate the elevated height of the assembly 10, as well as the size of the products being stored and retrieved. For example, telescoping arm members 19a, 19b may be provided for easy adjustment purposes. Further, the length of the arm member 18a and 18b may also be varied depending upon the position of the aisle, depth of the shelving and storage structure or product size. Arm members 19a, 19b may also be provided with a stub member for securement into the ends of arm member 18a, 18b for ease of the packaging and shipment of the parts of storage assembly 10. In summary, the storage system 10 of the invention provides a versatile storage and retrieval system for warehouse and retail floor use, for example.

Referring to FIGS. 10-13, exemplary power means of the storage system, 10 are shown. A rotatable drive shaft 23 is shown having a motor/gearbox 26 and strap spools 38 on which the straps 33 are wound. The rotatable shaft 23 is mounted on sealed bearings and held by upper rail 11. Free fall arrester assemblies 37 and 40 are provided for safety purposes, one for the drive shaft 23 and the other for the strap controlled tiltable structure 17. In FIG. 11, housing 34 is shown covering the elements of the power means and having apertures 42 through which straps 33 extend to be fastened to strap hooks 36 on support member 31 which extends between pivotable arm assemblies 14a and 14b. Aperture 45 is shown provided for wire 43 of the freefall arrester 37. FIG. 11 is also shown to have a tiltable frame structure which may have more than one storage bar 28. The latter may be utilized, for example, to store rolls of wire, rope, etc. which would allow a merchant to raise and lower the roll stock when required.

Figure 12:
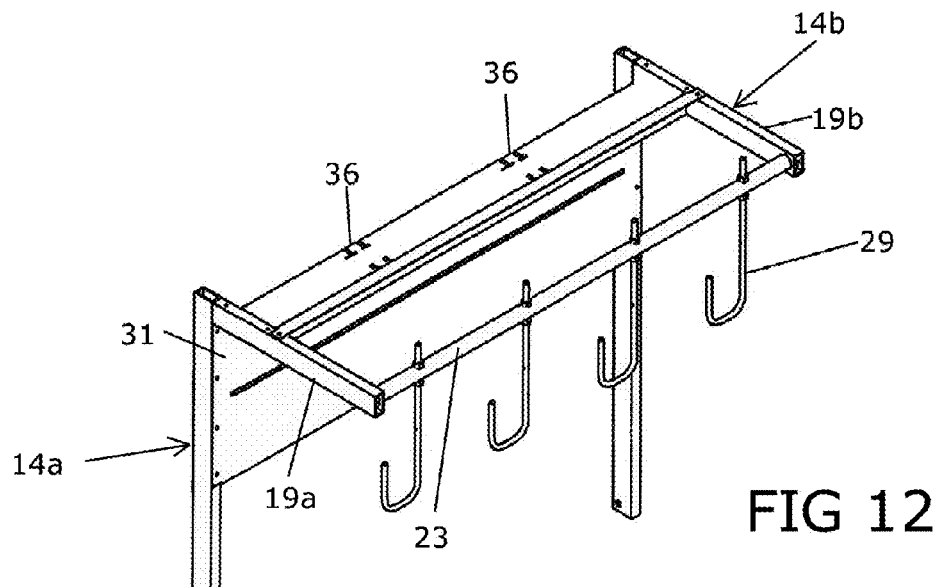
FIG. 12 is a perspective view showing the pivotable arm assemblies and rotatable storage bar of the pivotable frame structure.
Figure 13:
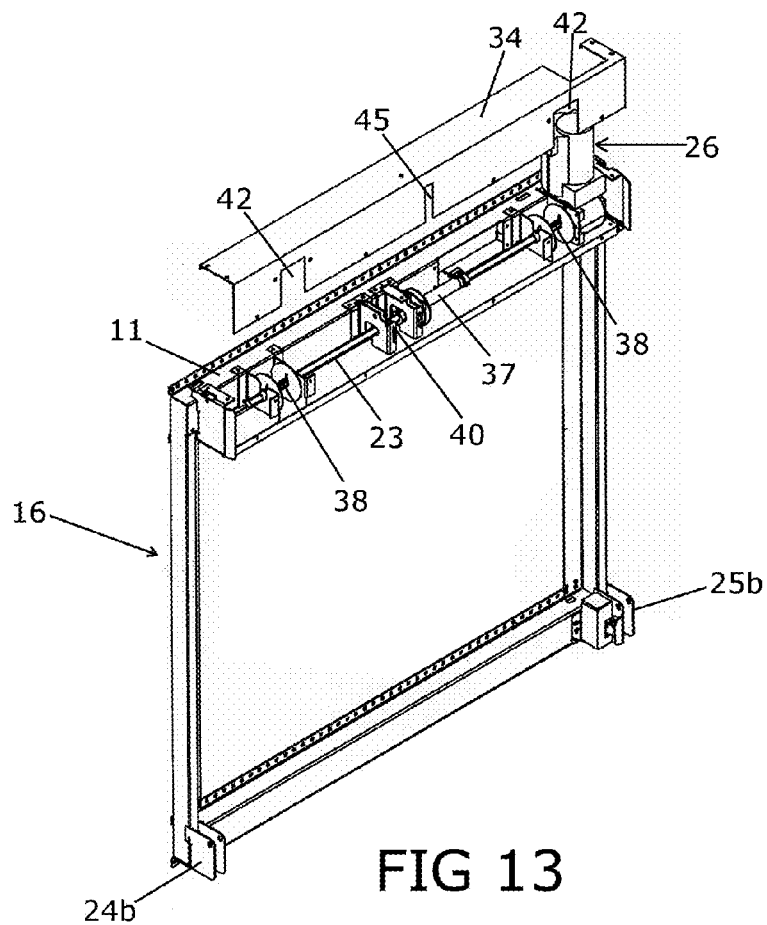
FIG. 13 is a perspective view showing the drive shaft motors, gear boxes and free fall arrester assemblies of the power apparatus of the storage system of the invention.

FIG. 12 shows the tiltable frame structure 17 and FIG. 13 shows the power means of the storage system 10 which is preferably a DC low voltage, i.e., 24 volt system. The DC motor/gearbox structure 26 may be provided to accommodate the storage loads. For example, a 60 rpm, 24V DC motor provides the torque that may be utilized to store and retrieve 175 lb loads. The gear reduction box, motor size, whether AC or DC powered, may all be varied to accommodate desired storage loads. The DC power source 35 may be a 110 AC volt to 24 DC volt converter which provides electrical current to DC motor 26 mounted at the upper mounting bracket 11 to operate drive shaft 23. The converter 35 may be utilized to power a plurality of storage systems 10, i.e., five such assemblies 10. Upper limit switch 46 and lower limit switch 47 are shown positioned at the upper mounting bracket 11 and at the lower mounting bracket 12, respectively. The activation switch 30 is also shown, as is the placement of switch 30 in a storage location in FIG. 9. The switch 30 may be a toggle type switch for up/down movement and requiring the constant pressure for operation to provide a safety feature. The switch 30 is shown to be connected to wiring 53 having a modular connector so that it may be easily removed if desired. The wiring of the assembly 10 preferably uses the latter wiring configuration for easy assembly, use and maintenance.

FIG. 13 shows drive shaft 23 mounted to the upper mounting bracket 11 of the stationary frame structure 16. The drive shaft 23, i.e., a ⅝ inch diameter steel shaft, is shown driven by motor/gearbox 26 and has spools 38 for winding straps 33. A pair of free fall arrester structures 37 and 40 are shown as safety devices. Free fall arrester 37 is associated with windable wire 43, as shown in FIG. 1, and which is adapted to control the pivoting of the tiltable frame structure 17 should strapping 33 fail and which utilizes a torsion spring wound about and secured to drive shaft 23. The windable wire 43 is preferably a ⅛ inch stainless steel wire having a tensile strength of 1,750 lbs, for example. Free fall arrester 40 is associated with drive shaft 23 and adapted to stop the pivotable frame structure 17 should the drive shaft 23 be caused to rotate freely due to motor/gearbox connection or key connector failure, for example, and may utilize a cam structure which kicks outwardly due to centrifugal force and then stopped by a catch mechanism mounted to upper rail 12. The latter or similar prior art devices may be used for this safety application.

Figure 14:
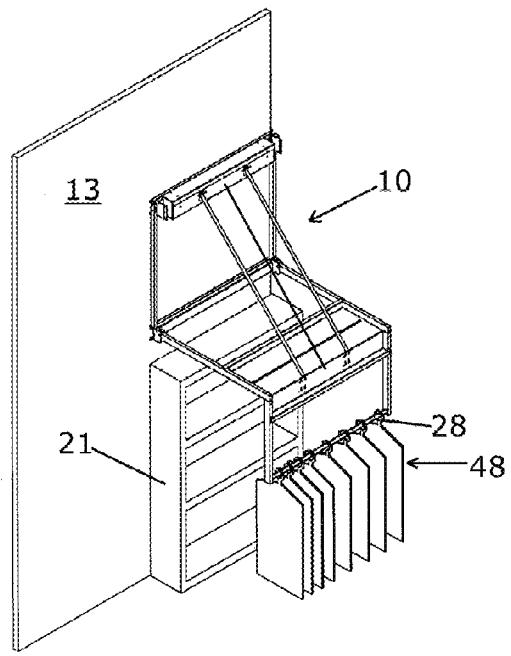
FIG. 14 is a perspective view showing garments stored by the storage system.
Figure 15:
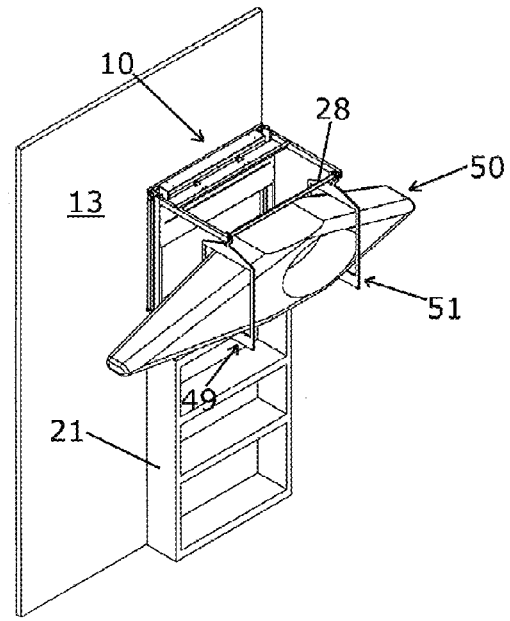
FIG. 15 is a perspective view showing a kayak stored by the storage system.
Figure 16:
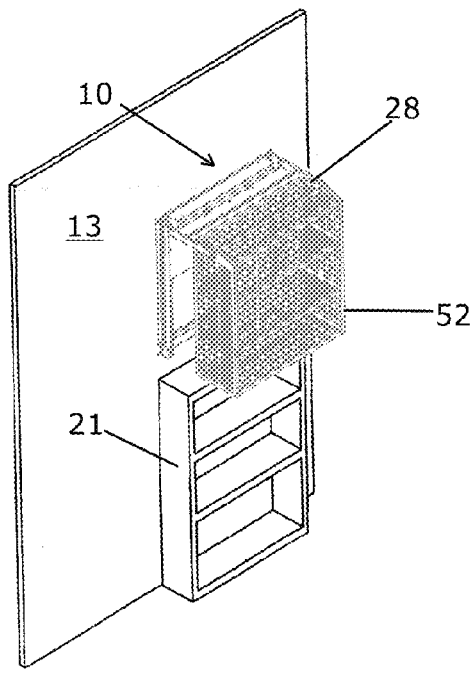
FIG. 16 is a perspective view showing a storage basket mounted to the storage bar of the storage system.

As shown in FIGS. 14-16, the storage system 10 may utilize storage structures other than a rotatable bar 28 having hooks 29. Other products or goods may also be stored and retrieved utilizing the storage system 10 of the invention. For example, large products such as kayaks or canoes may be stored in a lengthwise elevated position along a wall and hanging from the storage bar 28. For example, a bar 28 may be used for hanging garments, other product fasteners, may be used instead of hooks, and storage structures, such as baskets or the like may be utilized with respect to the tilting frame structure to lower goods to the floor of a warehouse or retail establishment and to store goods in an elevated position above existing shelving, for example.

FIGS. 14-16 further show the versatility and uses of the storage system 10 of the invention. For example, FIG. 14 shows a plurality of garments 48 stored via hangers on storage bar 28. FIG. 15 shows a kayak 50 held by storage frames 49 and 51 attached to storage bar 28. FIG. 16 shows a storage basket or cage 52 attached to storage bar 28 and which has a plurality of shelves which may be utilized to store items such as jewelry, DVDs and the like, the latter being storable at a safe upper warehouse location, for example. Because the power activation may be configured having quick disconnect modular electrical components, the stored goods may only be accessible by authorized personnel and at predetermined times during the day, for example.

As many changes are possible to the storage system embodiments of this invention utilizing the teachings thereof, the descriptions above, and the accompanying drawing should be interpreted in the illustrative and not in the limited sense.

That which is claimed is:

1. A tiltable storage assembly for the storage and retrieval of goods comprising:
   a) a stationary frame structure having a bottom portion and a top portion constructed for mounting in a vertical orientation at an elevated position, said stationary frame structure being a unitary structure having an upper mounting bracket, a lower mounting bracket, each having terminal ends, and a pair of vertical support structures connecting said terminal ends of said upper and lower mounting brackets;
   b) lower end brackets mounted at said terminal ends of said lower mounting brackets of said stationary frame structure and upper end brackets mounted inward said terminal ends of said upper mounting bracket of said stationary frame structure;
   c) a tiltable frame structure pivotally connected to said lower end brackets of said lower mounting bracket and being adjacent said bottom portion of said stationary frame structure, said tiltable frame structure further having a support plate and a storage structure, wherein said tiltable frame structure comprises a pair of pivotable arm assemblies and wherein said storage structure extends between said pivotable arm assemblies and wherein said storage structure is a bar;
   d) a windable strap extending between said top portion of said stationary frame structure and said support plate of said tiltable frame structure; and
   e) a power source to wind and unwind said windable strap, whereby when said power source is activated said tiltable frame structure pivots at said lower end brackets toward and away from said upper end brackets of said upper mounting bracket.

2. The tiltable storage assembly of claim 1, wherein said rotatable bar has at least one hook member.

3. The tiltable storage assembly of claim 1, wherein a free fall arrester device is provided for said power source and for the movement of said tiltable frame structure.

4. The tiltable storage assembly of claim 1, wherein said power source comprises a drive shaft, a DC motor coupled to a gearbox having reduction gears and at least one spool for said windable strap, said windable strap being connected to said support plate of said tiltable frame structure.

5. The tiltable storage assembly of claim 4, wherein said windable strap comprises a nylon strap.

6. The tiltable storage assembly of claim 1, wherein said power source includes an upper and lower limit switch and an activation switch.

7. A wall mounted storage system comprising:
   a) an upper and a lower mounting bracket for attachment to a building support structure, said lower mounting bracket having lower end brackets extending therefrom;
   b) spaced pivotable arms having bottom and top portions and being pivotally connected to said lower end brackets of said lower mounting bracket, whereby said spaced pivotable arms are pivoted adjacent said lower mounting bracket and the building support structure, wherein said upper and lower mounting brackets are elongated rail members having spaced apertures to receive fasteners and wherein said pivotable arms are L-shaped members having specified dimensions, wherein said lower end brackets have an aperture to receive a pivot pin connecting each said lower end bracket to said spaced pivotable arms, said spaced pivotable arms further having a support plate extending therebetween;
   c) a storage structure extending between said upper portions of said pivotable arms;
   d) a power source communicating with and holding said spaced pivotable arms during rotation of said pivotable arms from a first to a second position; and
   e) an activation device communicating with said power source, whereby the activation of said power source causes said storage structure to pivot from the first to the second position to provide access to said storage structure.

8. The wall mounted storage system of claim 7, wherein said power source includes wiring having modular connector.

9. The wall mounted storage system of claim 7, wherein said power source is a drive shaft driven by a DC motor having an AC/DC converter or an AC motor, said drive shaft further having a free fall arrester in communication therewith.

10. The wall mounted storage system of claim 9, wherein said motor communicates with said drive shaft having an elongated, flexible member windable on a spool mounted thereon, said motor having an activation switch, said motor further having a gear box communicating therewith.

11. The wall mounted storage system of claim 7, wherein said storage structure is a rotatable support bar having a plurality of hanging elements.

12. The wall mounted storage system of claim 11, wherein said hanging elements are hooks to receive the wheel of a bicycle.

13. A tiltable storage assembly for mounting in a vertical orientation at an elevated position for the storage and retrieval of goods comprising:
   a) a stationary frame having an upper mounting bracket, a lower mounting bracket and vertical support structures connecting said upper and lower mounting brackets;
   b) a tiltable frame structure having a pair of pivotable arms and a support plate therebetween, said pivotable arms comprising L-shaped members each having a first terminal end for pivotable movement adjacent said lower mounting bracket and having a second terminal end, a storage structure for holding goods extending between said second terminal ends of said L-shaped members of said tiltable frame structure;
   c) a rotatable shaft mounted on said upper mounting bracket, said rotatable shaft having a spool with an elongated strap mounted thereto, a power source in communication with said rotatable shaft and a first freefall arrester communicating with said rotatable shaft, said elongated strap extending from said spool to said support plate of said tiltable frame structure;
   d) a first and second lower end bracket mounted to said lower mounting bracket of said stationary frame, said first and second lower end brackets constructed and arranged to receive said first terminal ends of said L-shaped members of said tiltable frame structure; and
   e) first and second pivot pins connecting said first terminal ends of said L-shaped members to said first and second lower end brackets, whereby upon the activation of said power source, said tiltable frame structure moves between a storage position, whereby said L-shaped members are adjacent and pivoted parallel to said vertical support structures of said stationary frame and pivoted to a retrieval position whereby said L-shaped members are perpendicular to said vertical support structures, wherein an upper end bracket is mounted at said upper mounting bracket of said stationary frame, said upper end bracket has angled ends to guide said tiltable frame when being pivoted to a storage position.

14. The tiltable storage assembly of claim 13, wherein said power source comprises a motor and an activation switch and wherein a second freefall arrester is provided in communication with said tiltable frame structure.

15. The tiltable storage assembly of claim 13, wherein said storage structure is a rotatable bar.

* * * * *